United States Patent
Chalmers et al.

(10) Patent No.: US 11,297,371 B1
(45) Date of Patent: *Apr. 5, 2022

(54) VEHICLE VIDEO SYSTEM

(71) Applicant: Apple Inc., Cupertino, CA (US)

(72) Inventors: Devin W. Chalmers, Oakland, CA (US); Sean B. Kelly, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 16/391,573

(22) Filed: Apr. 23, 2019

Related U.S. Application Data (63) Continuation of application No. 15/708,554, filed on Sep. 19, 2017, now Pat. No. 10,306,289.

(60) Provisional application No. 62/398,081, filed on Sep. 22, 2016.

(51) Int. Cl.
| | |
|---|---|
| *H04N 21/414* | (2011.01) |
| *H04N 21/4223* | (2011.01) |
| *H04N 21/44* | (2011.01) |
| *H04N 21/472* | (2011.01) |
| *H04N 21/4788* | (2011.01) |

(52) U.S. Cl.
CPC ... *H04N 21/41422* (2013.01); *H04N 21/4223* (2013.01); *H04N 21/44004* (2013.01); *H04N 21/4788* (2013.01); *H04N 21/47217* (2013.01)

(58) Field of Classification Search
None
See application file for complete search history.

(56) References Cited

U.S. PATENT DOCUMENTS

| | | |
|---|---|---|
| 5,961,571 A | 10/1999 | Gorr et al. |
| 6,895,126 B2 | 5/2005 | Di Bernardo et al. |
| 7,190,259 B2 | 3/2007 | Kumata et al. |
| 8,447,136 B2 | 5/2013 | Ofek et al. |
| 8,817,067 B1 | 8/2014 | Fan et al. |
| 8,854,422 B2 | 10/2014 | Hadwiger et al. |
| 8,933,986 B2 | 1/2015 | Schall et al. |
| 8,989,700 B2 | 3/2015 | Cordero et al. |
| 9,030,524 B2 | 5/2015 | Shimizu |
| 9,055,216 B1 | 6/2015 | Taylor |
| 9,204,040 B2 | 12/2015 | Langlotz et al. |
| 10,306,289 B1* | 5/2019 | Chalmers ........... H04N 21/2743 |
| 2001/0006525 A1 | 7/2001 | Mizuguchi et al. |
| 2004/0008255 A1 | 1/2004 | Lewellen |
| 2004/0100443 A1 | 5/2004 | Mandelbaum et al. |
| 2004/0165546 A1 | 8/2004 | Roskind et al. |
| 2006/0184969 A1 | 8/2006 | Yamamoto et al. |
| 2006/0187238 A1 | 8/2006 | Yoneji |
| 2008/0043020 A1 | 2/2008 | Snow et al. |
| 2008/0044061 A1 | 2/2008 | Hongo |
| 2008/0066109 A1 | 3/2008 | Dunning et al. |

(Continued)

FOREIGN PATENT DOCUMENTS

| | | | |
|---|---|---|---|
| EP | 2563008 A2 | 2/2013 | |
| JP | 2013162328 A | * 8/2013 | ......... H04N 21/4223 |
| WO | 2015155715 A2 | 10/2015 | |

*Primary Examiner* — Junior O Mendoza
(74) *Attorney, Agent, or Firm* — Young Basile Hanlon & MacFarlane, P.C.

(57) ABSTRACT

A method includes obtaining a video based on images detected with cameras mounted on a vehicle and displaying a portion of the video corresponding to a time offset and a viewing angle.

20 Claims, 5 Drawing Sheets

(56) References Cited

U.S. PATENT DOCUMENTS

| | | | |
|---|---|---|---|
| 2008/0117287 A1* | 5/2008 | Park | G06T 7/30 |
| | | | 348/36 |
| 2008/0266142 A1 | 10/2008 | Sula et al. | |
| 2008/0285886 A1 | 11/2008 | Mien | |
| 2009/0073265 A1 | 3/2009 | Greenhill et al. | |
| 2009/0240431 A1 | 9/2009 | Chau et al. | |
| 2011/0074916 A1 | 3/2011 | Demirdjian | |
| 2012/0229596 A1 | 9/2012 | Rose et al. | |
| 2012/0249789 A1* | 10/2012 | Satoh | G06K 9/00832 |
| | | | 348/143 |
| 2014/0047371 A1 | 2/2014 | Palmer et al. | |
| 2014/0340516 A1* | 11/2014 | Vojtisek | B60R 11/04 |
| | | | 348/148 |
| 2015/0296140 A1 | 10/2015 | Kim | |
| 2016/0006922 A1* | 1/2016 | Boudreau | H04N 7/185 |
| | | | 348/207.1 |
| 2016/0105610 A1 | 4/2016 | Jayaram et al. | |
| 2016/0191798 A1 | 6/2016 | Yoo et al. | |
| 2018/0181568 A1* | 6/2018 | Leong | G06F 16/5866 |

\* cited by examiner

VEHICLE VIDEO SYSTEM

CROSS-REFERENCE TO RELATED APPLICATIONS

This application is a continuation of U.S. patent application Ser. No. 15/708,554, which was filed on Sep. 19, 2017, which claims the benefit of U.S. Provisional Application No. 62/398,081, which was filed on Sep. 22, 2016, the contents of which are hereby incorporated by reference in its entirety for all purposes.

TECHNICAL FIELD

The application relates generally to processing and use of video generated by a vehicle.

BACKGROUND

Some people have difficulty seeing out of a vehicle, because their view is obstructed by their positioning within the vehicle or because of vision. Some people wish to update friends or loved ones about their progress on a trip, e.g., when they are traveling in a vehicle to meet someone. Conventional facilities for sharing current location include providing coordinates on a map. But, map data may not tell the whole story.

SUMMARY

One aspect of the disclosure is a method that includes obtaining a video based on images detected with cameras mounted on a vehicle, storing the video in a memory, selecting a portion of the video based on input representing selection of a time offset and a viewing angle, and displaying the selected portion of the video corresponding to the time offset from the perspective of the viewing angle.

Another aspect of the disclosure is a non-transitory computer readable storage device having computer executable program instructions that are executable by one or more processors of a vehicle. The computer executable program instructions, when executed, cause the one or more processors to obtain a video based on images detected with cameras mounted on a vehicle, store the video in a memory, select a portion of the video based on a user selection of a time offset and a viewing angle, and display the portion of the video corresponding to the time offset from the perspective of the viewing angle.

Another aspect of the disclosure is a vehicle that includes a plurality of cameras, a network interface, a memory, and one or more computer processors. The one or more computer processors are configured to obtain a video based on images detected with the plurality of cameras, store the video in the memory, process a portion of the video based on input representing selection of a time offset and a viewing angle, and send, using the network interface to an electronic device, the processed portion of the video corresponding to the time offset from the perspective of the viewing angle.

DETAILED DESCRIPTION

Embodiments of vehicles described herein obtain, maintain, and distribute video that are recorded by sensors mounted on the vehicle. A vehicle video (e.g., a panoramic vehicle video) may be a high-bandwidth signal and may be difficult to display in its complete form on a display used by a user. In some cases, a user may wish to change the playback speed or to view a still image derived from the one or more frames of the vehicle video. It may be advantageous to select a portion of the vehicle video that is suitable for display to a particular user based on, for example, their viewing interface, their interest, and/or their access privileges.

In some implementations, a portion of the vehicle video may be selected for presentation to a user based on a time or location that is of interest. Vehicle video stored in a video buffer and frames of the vehicle video are associated with a time and with a location at which those frames where obtained. Vehicle video in the buffer is searched and identified using time and/or geolocation parameter to find relevant frames.

In some implementations, a user may view portions of a vehicle video on a personal device (e.g., a smartphone, a tablet, a head-mounted display). The user can also interact with how the video is displayed by, for example, orienting their personal device (that is displaying the video) to select a viewing angle from within the field of view of the vehicle video. In some implementations, the orientation of a personal device relative to the vehicle is used to determine viewing angle. For example, if the user orients the personal device such that the person device faces the rear of the vehicle, the personal device can proceed to display video from the perspective of someone who is looking out the rear of the vehicle. This allows a user situated in the vehicle to intuitively view the surroundings of the vehicle even in cases where their natural view is obstructed or otherwise impaired.

In some implementations, vehicle video may be shared between vehicles to explore conditions along a route that has been previously traveled by another vehicle (but is not yet traveled by this vehicle). This feature is useful, for example, in route planning.

In this document, the term "video" is used to refer to a sequence of frames of visual information obtained using one or more image sensors (e.g., cameras). The video can have regular or irregular frame rates. For example, a video may originate from camera images obtained regularly at 24 Hz as well as images obtained upon the occurrence asynchronous events (e.g., a vehicle stopping). A single frame of a "video" is sometimes referred to as an image. That single frame of video is created from image data captured from one or more cameras.

Figure 1:
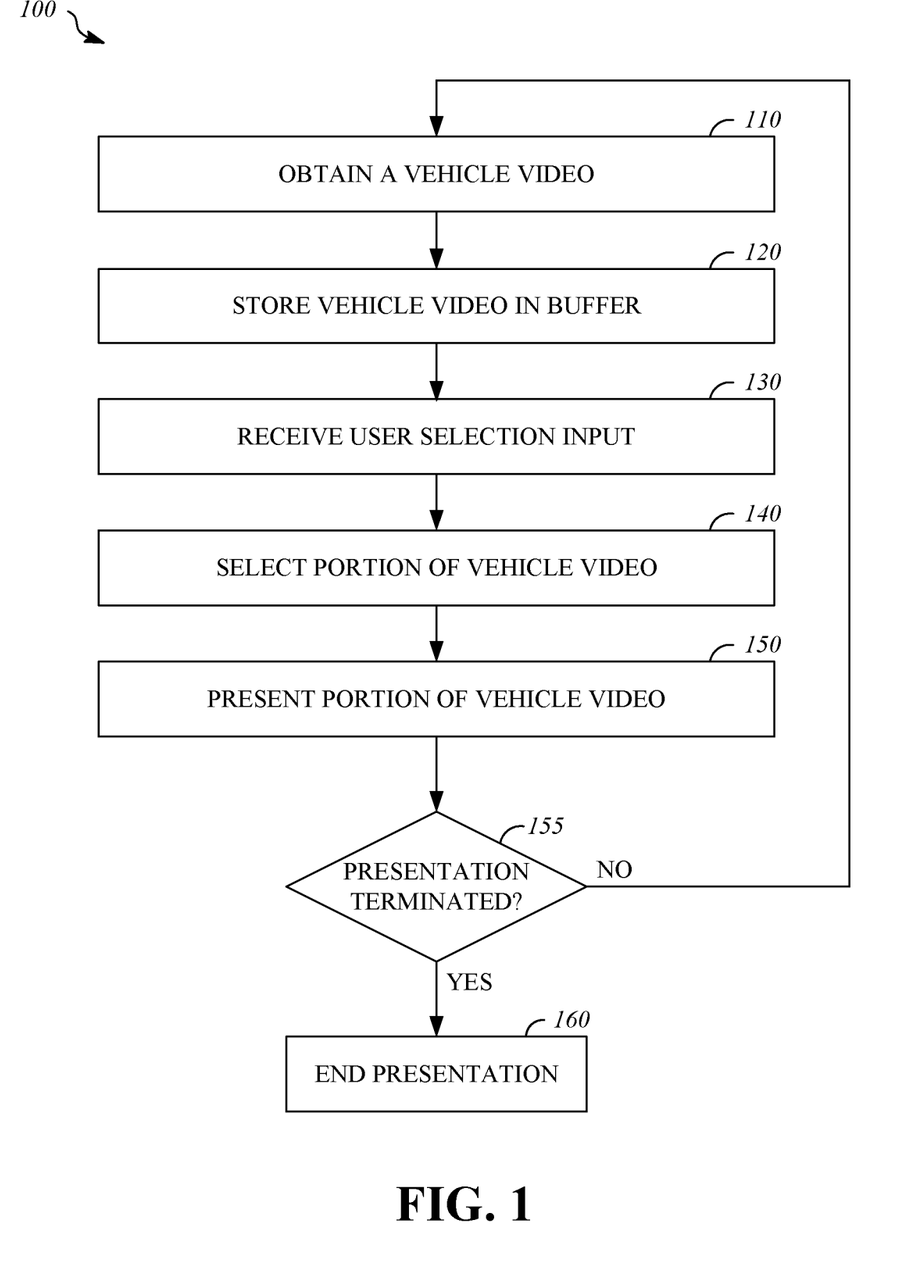
FIG. 1 is a flowchart of an exemplary process for interactively presenting images from a video recorded by a vehicle.

FIG. 1 shows exemplary process 100 for interactively presenting images and/or videos recorded by a vehicle. A vehicle video is obtained in operation 110 from one or more cameras mounted on a vehicle. The vehicle video may be a composite video that is determined by merging images detected with multiple cameras mounted on the vehicle. For example, the cameras may be arranged in an array such that the fields of view for the cameras overlap and collectively span perspectives along an arc. In some implementations, images with overlapping fields of view from multiple cameras may be stitched together (e.g., using image stitching software) to form a composite video with a field of view spanning this arc. In some implementations, the resulting composite video is a panoramic video in the sense that the field of view of the composite video spans a 360-degree arc around the vehicle. In some implementations, the vehicle video is obtained in operation 110 from a single camera mounted on the vehicle. The single camera may be stationary (i.e., omnidirectional relative to the vehicle) or may rotate about the vehicle. Composite and panoramic videos are possible using a single camera that rotates.

The cameras used in various examples can have regular, wide-angle, and/or fisheye lenses. Images detected using a fisheye lens, or other distorting lens, may be processed to transform the image and reduce distortion effects from the lens. For example, a vehicle video may be obtained in operation 110 by an image processing module (e.g., image processing module 360 of FIG. 3) based on images detect by an array of cameras (e.g., camera array 350 of FIG. 3) mounted on a vehicle.

In some implementations, additional types of videos may be obtained as the vehicle video 110, such as a single panoramic image from a sequence of images, a time lapse video, a slow-motion video, or a fused-image video that combines overlapping images obtained from multiple cameras to increase the resolution of fidelity of the final images.

A vehicle video may be stored in operation 120 in memory, e.g., a video buffer. In some implementations, the vehicle video is encoded in the buffer in a compressed format (e.g., MPEG-4). Frames of the vehicle video encoded in the buffer may be associated with a timestamp or an offset from a current time. For example, a data structure in the buffer storing the vehicle video may include one or more fields that specify a when a frame of the vehicle video was obtained in operation 110. In some implementations, frames of the vehicle video encoded in the buffer may be associated with a location (e.g., a geolocation) that was occupied by the vehicle when the image(s) on which a frame was based were obtained in operation 110. In some implementations, vehicle video may be securely stored in operation 120 with associated user permissions that grant only a specific user or users access to portions of the vehicle video. For example, a vehicle video may be stored in operation 120 by an image processing module (e.g., image processing module 360 of FIG. 3) in a buffer implemented on a data storage apparatus (e.g., data storage apparatus 420 of FIG. 4). The buffer may be, for example, a memory space of the data storage apparatus.

Selection input from a user may be received in operation 130. Selection input may specify a portion of vehicle video that is of interest to a user. In some implementations, selection input includes one or more parameters that specify a viewing angle within an available vehicle video. For example, a user viewing a portion of the vehicle video on a hand-held display device may select a viewing angle within the vehicle video by rotating the hand-held display device. This rotation of the hand-held device may be detected by sensors in the device (e.g., accelerometer, gyroscope, and/or magnetometer) and converted into a viewing angle or adjustment to a viewing angle and forwarded to an image processing system (e.g., image processing module 360 in FIG. 3) that maintains and/or distributes portions of the vehicle video. For example, a user may select the viewing angle by tilting or turning a head of the user while the user is wearing a head-mounted display device (e.g., virtual reality goggles).

In some implementations, the viewing angle for a user situated within a vehicle may be determined based on a relative orientation of a personal device of the user to a body and/or a camera array of the vehicle. The relative orientation of the personal device to the vehicle may be synchronized from time to time. In some embodiments, devices are included in the vehicle, such as radio, infrared, or visual positioning indicators, that allow the device to sense its orientation relative to the vehicle. In some embodiments, the absolute orientation of the personal device may be determined by sensors within the personal device, the personal device may receive from the vehicle regarding an absolute orientation of the vehicle, and the personal device may use the information describing the orientations of the personal device and the user device to determine the orientation of the personal device relative to the user device. In some embodiments, a manual calibration of the relative orientation of the personal device may be performed by the user orienting the personal device to point at a reference object or direction (e.g., point the device straight ahead in the direction of motion of the vehicle) and simultaneously indicating that the synchronization should occur (e.g., by pressing a 're-center' button on a user interface or executing a 're-center' gesture in a user interface). Between synchronization events, the relative orientation may be tracked, for example, by using sensors to track the evolution of the orientation of the vehicle and the personal device. In some implementations, a portion (e.g., one or more images) of the vehicle video, selected for presentation based on this relative orientation selection input, may depict a view from the vehicle in a direction parallel to an axis perpendicular to a display surface of the display device. This specification of the viewing angle may allow the user to seemingly look through the body of the vehicle at the area surrounding the vehicle using their personal device displaying portions of the vehicle video. A portion of the vehicle video viewed may be current (e.g., the most recent available frames) or older (e.g., from previous trip when the vehicle passed by the current location).

In some implementations, selection input may specify a time offset, for example, a time offset from the most recent frame of vehicle video. For example, a user may view a portion of the vehicle video on a personal device and a user interface screen may be output for display to the user on the display of the personal device. The user interface screen may include a display of the vehicle video and an interface element that is output for display as part of the user interface screen to allow selection of the time offset by the user. One example of a user interface element that may be included in the user interface screen for selection of the time offset is a scrub bar. The user may slide an icon along the scrub bar on their display to specify a time offset at which they wish to view portions of the vehicle video. Data specifying this time offset may be forwarded to an image processing system (e.g., image processing module 360 in FIG. 3) that maintains and/or distributes portions of the vehicle video. In some implementations, selection input may be received in operation 130, in wireless communications signals from a device operated by a user.

In some implementations, the user providing selection input may be located remotely from the vehicle. For example, a remote user meeting the vehicle may check the progress of that vehicle by viewing portions of the vehicle video as the vehicle travels to a meeting place.

Figure 3:
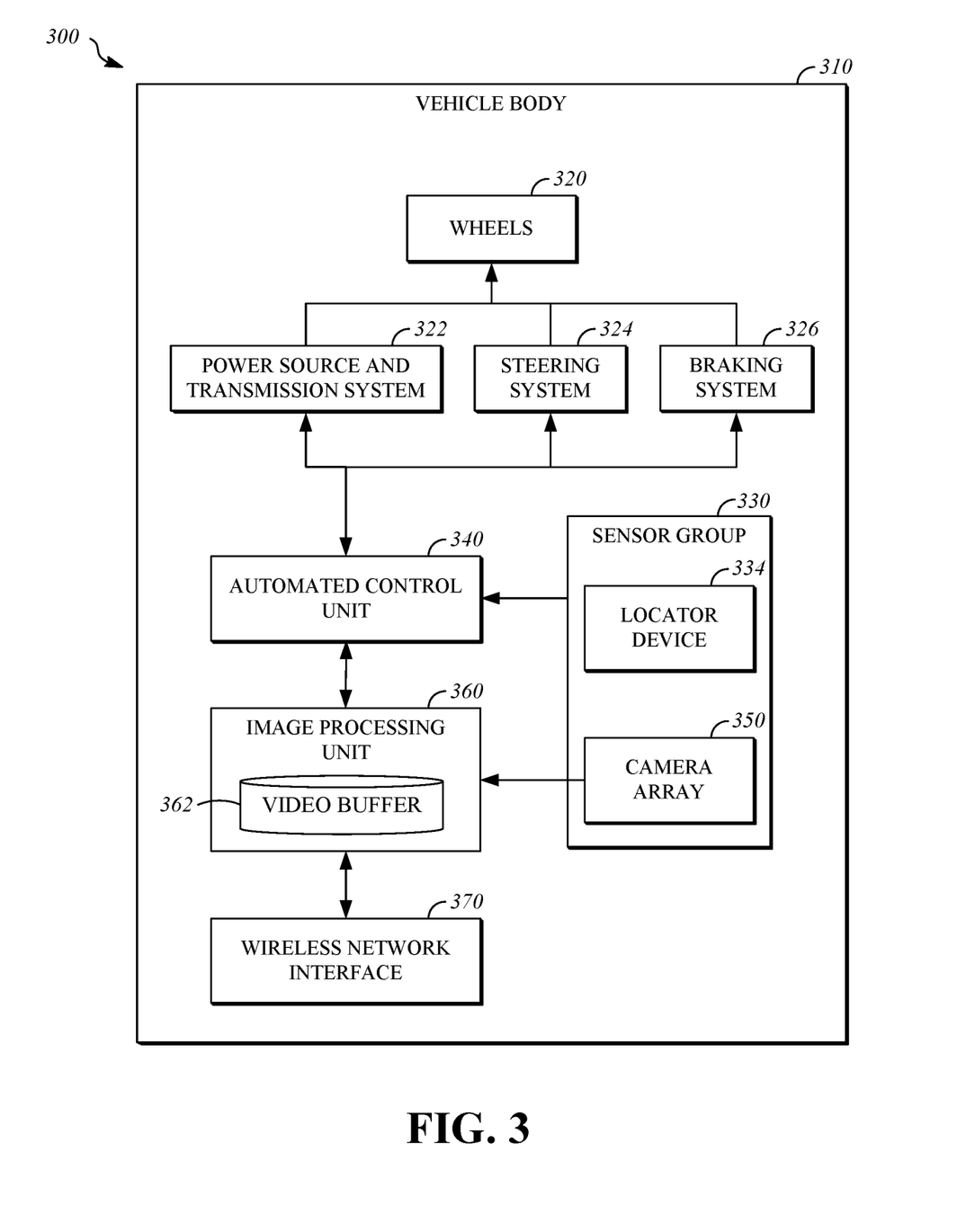
FIG. 3 is a block diagram of an exemplary vehicle.

In some implementations, selection input from a user may be received in operation 130 by an image processing module (e.g., image processing module 360 of FIG. 3) via a wireless interface (e.g., wireless network interface 370 of FIG. 3).

A portion of the vehicle video may be selected in operation 140. It may be advantageous to select a portion of the vehicle video that is suitable for display to a particular user based on, for example, their viewing interface, their interest, and/or their access privileges. In some implementations, a portion of a vehicle video is selected in operation 140 based in part on a viewing angle specified by a user. The viewing angle is used to select a spatial portion of the video (e.g., a panoramic video) for display to the user. The viewing angle may be the same as the angular orientation of one of the cameras that captured the video, or the viewing angle may be an angle other than the angular orientations of the cameras, in which case the video is displayed from an interpolated perspective between at least two of the cameras. In some implementations, portion of a vehicle video is selected in operation 140 based in part on a time offset specified by a user. For example, a portion of the vehicle video may be selected in operation 140 by an image processing module (e.g., image processing module 360 of FIG. 3).

For example, a user may be interested in looking at an area to the left of the vehicle that was passed two minutes ago. Selection input to this effect may be specified by the user through the user's interface and then forwarded, in a suitable format, to an image processing module (e.g., image processing module 360 of FIG. 3) that maintains and/or distributes the vehicle video. The time offset of 2 minutes prior to the current or most recent frame of vehicle video may be used to identify and retrieve a relevant frame or frames from the buffer where the vehicle video is stored. The viewing angle specified in the selection input (e.g., 90 degrees left from direction of vehicle motion) may be used to pan within the relevant frame or frames to center the view in the direction of interest to the user. In some implementations, due to limitations on bandwidth of a communications link to a user device and/or limitations of the user display (e.g., a tablet or smartphone display) the field of view presented to the user may be limited (e.g., to a 120-degree field of view). Thus, in this example scenario, a portion of the vehicle video may be selected in operation 140 as a slice of a larger (e.g., panoramic) vehicle video, where the portion has a 120-degree field of view and is centered on a direction 90 degrees left from the direction of motion of the vehicle. This portion of the vehicle video may include slices from one or more frames of the vehicle with timestamps near the specified time offset of 2 minutes ago. In some implementations, the portion selected in operation 140 may be a still image derived from one or more of these slices.

In some implementations, a portion of the vehicle video selected in operation 140 may be restricted to include only portions for which user has access privileges. For example, where two users share a vehicle, vehicle video may be stored in operation 120 securely and privately within the buffer and, by default, a particular user may be granted access to only portions of vehicle video obtained during the particular user's operation of the shared vehicle.

A selected portion of the vehicle video may be presented to a user in operation 150. In some implementations, the portion of the vehicle video is presented in operation 150 by transmitting (e.g., via wireless network interface 370 of FIG. 3) communications signals encoding the portion of the vehicle video to a personal device (e.g., a tablet, a smartphone, a head-mounted display) of a user that is configured to display the portion. In some implementations, a personal device of the user may be configured to allow the user to store images from the portion of the vehicle video displayed. For example, a personal device of the user may be configured to display the portion of the vehicle video in an interface that includes a 'photo snap' button or icon, which, when pressed, causes the personal device to store an image from the portion of vehicle video displayed in a digital photo format. This image may be stored on the user's personal device and/or signals may be transmitted to vehicle, causing the image to be stored in a storage apparatus in the vehicle, for example, as a file associated with the user.

In some implementations, a personal device of the user may be configured to allow the user to store a video excerpt from the portion of the vehicle video displayed. For example, a personal device of the user may be configured to display the portion of the vehicle video in an interface includes a 'record' button or icon, which, when pressed, causes the personal device to store one or more frames from the portion of vehicle video displayed in a digital video format. This video excerpt may be stored on the user's personal device and/or signals may be transmitted to vehicle, causing the video excerpt to be stored in a storage apparatus in the vehicle, for example, as a file associated with the user.

In some implementations, the vehicle video may be displayed on a user device in an interface that resembles a traditional smartphone camera application interface. For example, the interface may include icons or button for causing a displayed portion of vehicle video to be stored (e.g., as a still photo file or as a video file). For example, the interface may allow a user to digitally zoom in or zoom out on a displayed portion of vehicle video, for example, by performing zoom gesture (e.g., a pinch-to-zoom gesture on a touch screen).

In some implementations, the selected portion of the vehicle video may be presented in operation 150 by displaying the portion on a display mounted in the vehicle. For example, the display may be connected via a wired or wireless link to an image processing module in the vehicle (e.g., image processing module 360 of FIG. 3) that maintains and/or distributes the vehicle video.

A vehicle video presentation session may be terminated in operation 160 by the user or another event or command (e.g., the vehicle shutting down or a command from another user who controls access to the vehicle video) processed by an image processing module of the vehicle. If, in operation 155, the vehicle video presentation session is not terminated, an image processing module may continue receiving additional selection input from the user in operation 130 and/or presenting additional portions of the vehicle video to the user in operation 150.

Figure 2:
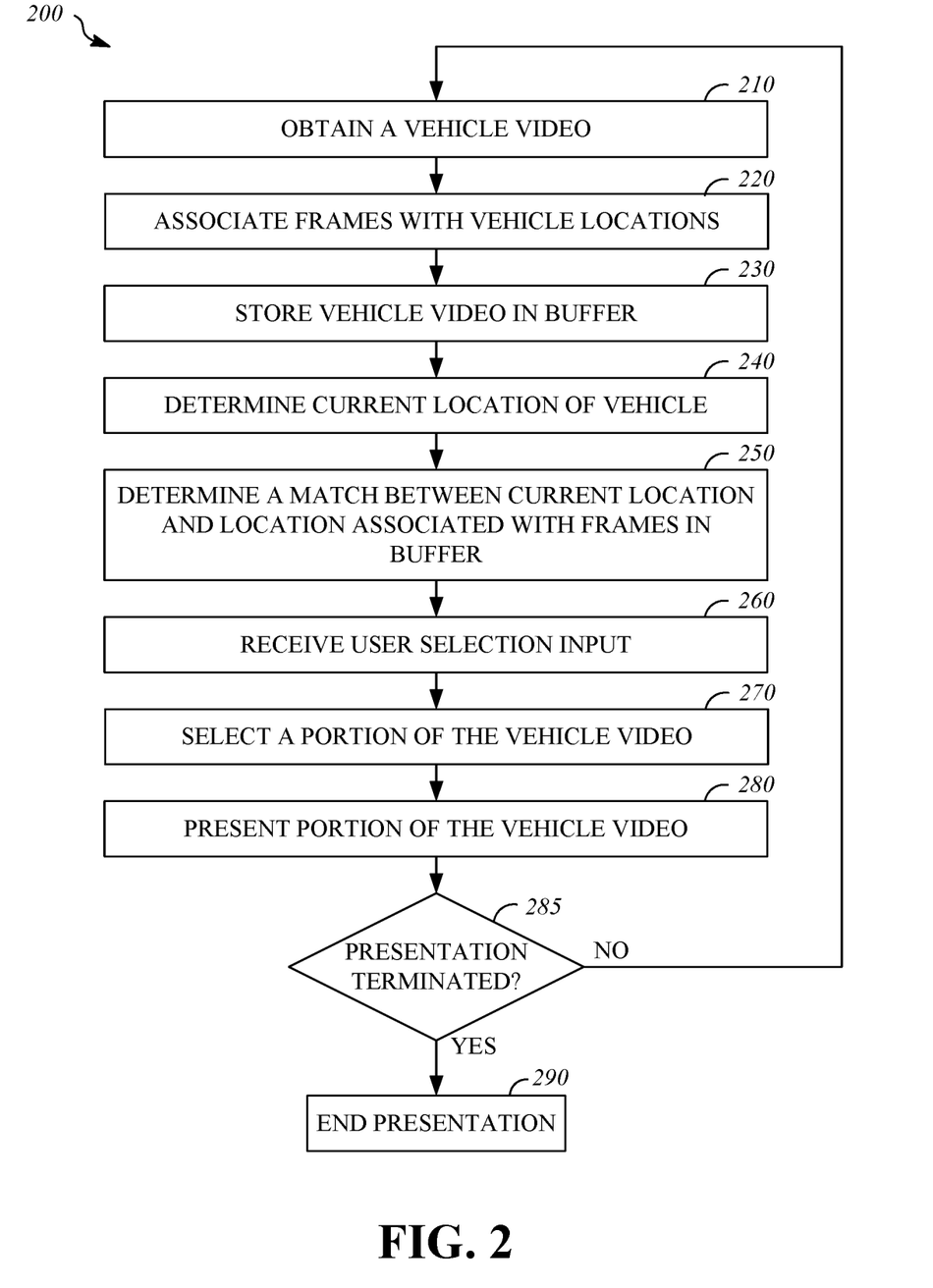
FIG. 2 is a flowchart of an exemplary process for presenting images of a location from a video recorded by a vehicle.

FIG. 2 shows an example of a process 200 for presenting images of a location from a video recorded by a vehicle. In some implementations, selecting images from past trips (e.g., from an earlier day or year) based on the current location may allow for the presentation of portions of vehicle video to progress in sync with the current movement of the vehicle, instead of being strictly time dependent, to account for different travel speeds of the two trips. For example, a user may be enabled to view the current surroundings at a past time in a display on their personal device as the vehicle moves.

A vehicle video is obtained in operation 210 from one or more cameras mounted on a vehicle. The vehicle video may be a composite video that is determined by merging images detected with multiple cameras mounted on the vehicle. For example, the cameras may be arranged in an array such that the fields of view for the cameras overlap and collectively span perspectives along an arc. In some implementations, images with overlapping fields of view from multiple cameras may be stitched together (e.g., using image stitching software) to form a composite video with a field of view spanning this arc. In some implementations, the resulting composite video is a panoramic video in the sense that the field of view of the composite video spans a 360-degree arc around the vehicle. In some implementations, the vehicle video may be obtained in operation 210 from a single camera mounted on the vehicle. For example, a vehicle video may be obtained from an omnidirectional camera. In some implementations, the vehicle video may be obtained in operation 210 from one or more cameras with a wide-angle lens or a fisheye lens mounted on the vehicle. For example, images detected using a fisheye lens, or other distorting lens, may be processed to transform the image and reduce distortion effects from the lens. For example, a vehicle video may be obtained in operation 210 by an image processing module (e.g., image processing module 360 of FIG. 3) based on images detect by an array of cameras (e.g., camera array 350 of FIG. 3) mounted on a vehicle.

Frames of the vehicle video may be associated with a location of the vehicle in operation 220. A location of the vehicle may be determined at a time when a frame of the vehicle video is obtained in operation 210. This determined location may be associated with this frame of vehicle video in operation 220. In some implementations, a location is associated with a frame of vehicle video in operation 220 by creating a record that includes data encoding the location and includes data encoding the frame or a pointer to data encoding the frame of vehicle video. In some implementations, a location is associated with a frame of vehicle video in operation 220 by creating a record including data encoding the frame and including a pointer to data encoding the location.

In some implementations, a location is stored as coordinates specifying a position. In some implementations, location information may be quantized into bins associated with particular landmarks, street addresses, roads, buildings, or other objects represented in map data. For example, a range of coordinates along a road passing in front of a building with a street address may be mapped to an identifier for that street address.

A vehicle video may be stored in a buffer in operation 230. A data structure encoding the vehicle video in the buffer may include one or more fields that encode, or point to data encoding, the associated location for a frame of the vehicle video. In some implementations, a data structure sorted by location data is stored and records in this data structure for locations point to data encoding one or more frames of the vehicle video that are associated with that location. In some implementations, frames of the vehicle video encoded in the buffer may also be associated with a timestamp or an offset from a current time. For example, a vehicle video may be stored in operation 230 by an image processing module (e.g., image processing module 360 of FIG. 3) in a buffer implemented on a data storage apparatus (e.g., data storage apparatus 420 of FIG. 4).

A current location of the vehicle may be determined in operation 240. In some implementations, a location of the vehicle may be determined in operation 240 using a locator module (e.g., locator module 334 of FIG. 3). For example, a location of the vehicle may be determined based in part on data from global positioning system (GPS) receiver. In some implementations, a variety of sensor data (e.g., from an accelerometer, an odometer, and/or a GPS receiver) may be fused to determine a location of the vehicle.

A match may be determined in operation 250 between the current location of the vehicle and a location associated with one or more frames of vehicle video stored in the buffer. In some implementations, determining a match in operation includes searching the buffer for frames of the first video that are associated with a location close to the current location. Two locations may be considered close if the distance between them is less than a threshold (e.g., 10 meters). For example, a sequence of locations associated with consecutive frames of the vehicle video may specify a path that the vehicle previously traveled. The current location may be projected onto this path to determine the closest point along the previously traveled path that is associated with vehicle video. This closest point along the previously traveled path may be determined in operation 250 to match the current location. In some cases, a buffer of vehicle video data may include numerous close passes by the current location. In some implementations, a list of frames from different previous passes on paths near the location may be found and returned as a group of matches.

In some implementations, determining a match for the current location in operation 250 may include mapping the current location into a quantized location bin (e.g., a range of location coordinates) that corresponds to an object represented in map data (e.g., a street address). Locations associated with frames of vehicle video in the buffer that have also been mapped to the same location bin (i.e., found to be within the same range of coordinates corresponding to an object represented in map data) may be determined in operation 250 to match the current location.

Selection input from a user may be received in operation 260. Selection input may specify a portion of vehicle video that is of interest to a user. In some implementations, selection input may include a selection of a historical view of the current location of the vehicle. For example, a frame of vehicle video that is associated with a matching location may also be associated with a timestamp. A list of matches for the current location may be returned and presented to a user as options with associated times. The user may select one or more of the past times available for viewing the current location. In an example scenario, a user may request historical views of an area surrounding the current location of the vehicle; the vehicle may return a list of times (e.g., now, 1 day ago, 1 week ago, etc.) associated with frames of vehicle video associated with matching locations that were found in the buffer; and the user may select from this list one or more times for which the user wishes to view portions of the vehicle video. Data specifying the user's selection of one or more historical views of the current location may be forwarded to an image processing system (e.g., image processing module 360 in FIG. 3) that maintains and/or distributes the vehicle video.

In some implementations, selection input includes one or more parameters that specify a viewing angle within an available vehicle video. For example, a user viewing a portion of the vehicle video on a hand-held display device may select a viewing angle within the vehicle video by rotating the hand-held display device. This rotation of the hand-held device may be detected by sensors in the device (e.g., accelerometer, gyroscope, and/or magnetometer) and converted into a viewing angle or adjustment to a viewing angle and forwarded to an image processing system (e.g., image processing module 360 in FIG. 3) that maintains and/or distributes portions of the vehicle video. For example, a user may select the viewing angle by tilting or turning a head of the user while the user is wearing a head-mounted display device (e.g., virtual reality goggles).

In some implementations, the viewing angle for a user situated within a vehicle may be determined based on a relative orientation of a personal device of the user to a body and/or a camera array of the vehicle. The relative orientation of the personal device to the vehicle may be synchronized from time to time. In some embodiments, devices are included in the vehicle, such as radio, infrared, or visual positioning indicators, that allow the device to sense its orientation relative to the vehicle. In some embodiments, the absolute orientation of the personal device may be determined by sensors within the personal device, the personal device may receive from the vehicle regarding an absolute orientation of the vehicle, and the personal device may use the information describing the orientations of the personal device and the user device to determine the orientation of the personal device relative to the user device. In some embodiments, a manual calibration of the relative orientation of the personal device may be performed by the user orienting the personal device to point at a reference object or direction (e.g., point the device straight ahead in the direction of motion of the vehicle) and simultaneously indicating that the synchronization should occur (e.g., by pressing a 're-center' button on a user interface or executing a 're-center' gesture in a user interface). Between synchronization events, the relative orientation may be tracked, for example, by using sensors to track the evolution of the orientation of the vehicle and the personal device. This specification of the viewing angle may allow the user to seemingly look through the body of the vehicle at the area surrounding the vehicle using their personal device displaying portions of the vehicle video. A portion of the vehicle video viewed may be current (e.g., the most recent available frames) or older (e.g., from previous trip when the vehicle passed by the current location).

In some implementations, selection input from a user may be received in operation 260 by an image processing module (e.g., image processing module 360 of FIG. 3) via a wireless interface (e.g., wireless network interface 370 of FIG. 3).

A portion of the vehicle video may be selected in operation 270. In some implementations, a portion is selected from one or more frames associated with the second location. For example, a still image may be selected in operation 270 from a single frame associated with the second location. In some implementations, a still image may be selected in operation 270, where the still image is an overlay, an average, a stitched composite, or some other combination of multiple frames of vehicle video that are associated with the second location. In some implementations, an excerpt of the vehicle video in the temporal vicinity (e.g., including frames slightly before and/or slightly after) of a frame associated with the second location is selected in operation 270 for presentation as a video. In some implementations, a portion of a vehicle video is selected in operation 270 based in part on a viewing angle specified by a user. In some implementations, portion of a vehicle video is selected in operation 270 based in part on a time offset specified by a user. In some implementations, a portion of the vehicle video selected in operation 270 may be restricted to include only portions for which user has access privileges. For example, where two users share a vehicle, vehicle video may be stored securely and privately within the buffer in operation 230 and, by default, a particular user may be granted access to only portions of vehicle video obtained during the particular user's operation of the shared vehicle. For example, a portion of the vehicle video may be selected in operation 270 by an image processing module (e.g., image processing module 360 of FIG. 3).

A selected portion of the vehicle video may be presented to a user in operation 280. In some implementations, the portion of the vehicle video is presented in operation 280 by transmitting (e.g., via wireless network interface 370 of FIG. 3) communications signals encoding the portion of the vehicle video to a personal device (e.g., a tablet, a smartphone, a head-mounted display) of a user that is configured to display the portion. In some implementations, a personal device of the user may be configured to allow the user to store images from the portion of the vehicle video displayed. For example, a personal device of the user may be configured to display the portion of the vehicle video in an interface that includes a 'photo snap' button, which, when pressed, causes the personal device to store an image from the portion of vehicle video displayed in a digital photo format. This image may be stored on the user's personal device and/or signals may be transmitted to vehicle, causing the image to be stored in a storage apparatus in the vehicle, for example, as a file associated with the user.

In some implementations, a personal device of the user may be configured to allow the user to store a video excerpt from the portion of the vehicle video displayed. For example, a personal device of the user may be configured to display the portion of the vehicle video in an interface includes a 'record' button, which, when pressed, causes the personal device to store one or more frames from the portion of vehicle video displayed in a digital video format. This video excerpt may be stored on the user's personal device and/or signals may be transmitted to vehicle, causing the video excerpt to be stored in a storage apparatus in the vehicle, for example, as a file associated with the user.

In some implementations, the selected portion of the vehicle video may be presented in operation 280 by displaying the portion on a display mounted in the vehicle. For example, the display may be connected via a wired or wireless link to an image processing module in the vehicle (e.g., image processing module 360 of FIG. 3) that maintains and/or distributes the vehicle video.

A vehicle video presentation session may be terminated at operation 290 by the user or another event or command (e.g., the vehicle shutting down or a command from another user who controls access to the vehicle video) processed by an image processing module of the vehicle. If the vehicle video presentation session is not terminated at operation 285, an image processing module may continue updating the current location of the vehicle in operation 240, determining matching locations in the buffer of vehicle video in operation 250, and/or presenting additional portions of the vehicle video to the user in operation 280.

In some implementations, a time lapse video of an object or location may be generated based on portions of vehicle video stored in a video buffer. For example, a plurality of images depicting a location (which may be referred to as a portion of a route or a "route portion") recorded on different days as a vehicle passed by the location are retrieved from the buffer and combined to form a time lapse video of the location. Approximately regularly timed snapshots of a location may be available in the video buffer for locations along a route regularly traveled, for example, the route of a commute. The regularly timed snapshots each correspond to a separate vehicle trip along a route portion that includes the location. For example, a user request for a time lapse video may specify a location and cause an image processing module to search a video buffer for frames of vehicle video that are associated with that location and sequence them into a time lapse video that may be presented to the user.

The process 100, the process 200, and other systems and methods disclosed herein involve transmission and/or storage of personal information such as images, videos, and location information. Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

FIG. 3 shows an example of a vehicle 300 configured for maintaining and distributing vehicle video. The vehicle 300 includes a vehicle body 310 that contains or is attached to the other systems and components of the vehicle 300. The vehicle 300 includes wheels 320 that are capable of serving as an interface between the vehicle and a road. The wheels provide control surfaces that may be used to guide the vehicle along paths on a road. The vehicle 300 includes a power source (e.g., a combustion engine and/or a battery) connected to the wheels via a transmission system 322 capable of spinning the wheels to accelerate the vehicle along a road. The vehicle 300 includes a steering system 324 capable of turning the wheels 320 in relation to the vehicle body 310 to direct the motion of the vehicle, e.g., by controlling the yaw angle and angular velocity or path curvature of the vehicle. The vehicle 300 includes a sensor module 330, configured to detect the state of the vehicle and its surroundings. The vehicle 300 includes an automated control module 340 that is configured to receive data from an image processing module 360, the sensor module 330, and possibly other sources (e.g., a vehicle passenger/operator control interface) and process the data to implement automated control of the motion of the vehicle 300 by sending control signals to the Power source & transmission system 322, the steering system 324, and the braking system 326 that are actuated by these systems via the wheels 320.

The sensor module 330 may include a locator module 334 that is configured to determine a current location of the vehicle. For example, locator module 334 may include a GPS receiver and/or other sensors (e.g., odometer, accelerometer, gyroscope) that can be used to facilitate make fine adjustments to an estimate of the current location. In some implementations, locator module 334 may output a vehicle location expressed in coordinates (e.g., longitude, latitude, elevation).

The sensor module 330 includes a camera array 350. The camera array 350 may include one or more cameras arranged in a fixed orientation with respect to each other in order to span a desired field of view for the vehicle. In some implementations, cameras in camera array 350 may be arranged so that their respective fields of view overlap, to facilitate stitching of images from the cameras into composite images of the surroundings. In some implementations, the field of view for camera array 350 spans a 360-degree arc around the vehicle (i.e., about a vertical axis when the vehicle is resting on its wheels on flat ground). For example, camera array 350 may include four cameras, each with a 120-degree field of view, arranged so that one faces forward, one faces left, one faces right, and one faces the behind the vehicle. In some implementations, one or more of the cameras in camera array 350 are omnidirectional cameras. In some implementations, one or more of the cameras in camera array 350 have a wide-angle lens. In some implementations, one or more of the cameras in camera array 350 have a fisheye lens.

Image processing module 360 may obtain images from camera array 350 at a desired frame rate (e.g., 24 Hz). For example, image processing module 360 may process the images using computer vision techniques to detect changes in the surroundings of the vehicle (e.g., detect other vehicles and obstacles) and generate models of the surroundings and/or alerts that can be passed to automated control module 340 to facilitate safe maneuvering of the vehicle. Images obtained from camera array 350 may also be encoded as vehicle video and stored in a video buffer 362. In some implementations, frames of the vehicle video may be associated with a time and/or a location when and/or where the images on which that frame is based was obtained.

Vehicle video may be accessed by a user situated in the vehicle or by a user at a remote location. In some implementations, a portion of the vehicle video is presented to a user by transmitting data encoding the portion to a personal device of the user via wireless network interface 370. For example, wireless network interface 370 may be configured to transmit and receive signals according to a wireless networking standard (e.g., Wi-Fi or WiMAX). For example, the image processing module 360 may be configured to implement process 100 as described in relation to FIG. 1. For example, the image processing module 360 may be configured to implement the process 200 as described in relation to FIG. 2. For example, the image processing module 360 may be configured to implement process 600 as described in relation to FIG. 6. The image processing module 360 may include specialized image processing hardware and/or software running on a data processing apparatus with additional capabilities.

Figure 4:
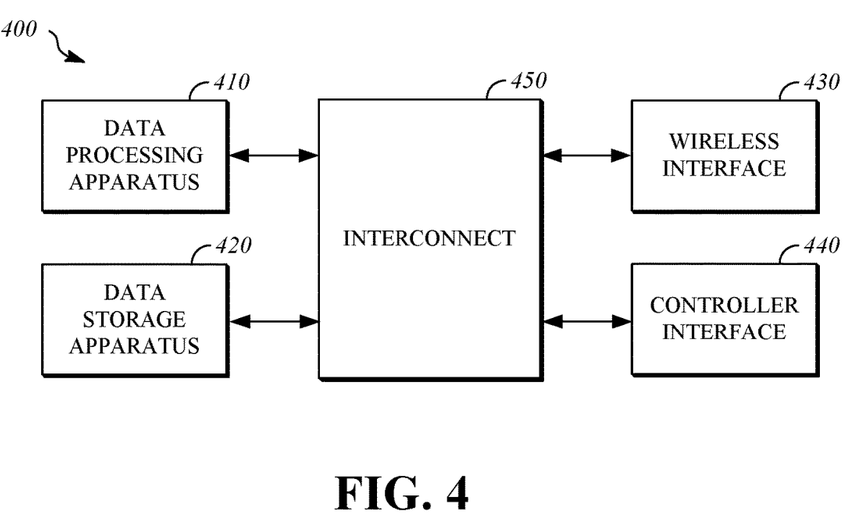
FIG. 4 is a block diagram of an exemplary hardware configuration for a vehicle controller.

FIG. 4 shows an example hardware configuration for a vehicle controller 400 configured to maneuver a vehicle and provide additional services including the maintenance and distribution of vehicle video. The hardware configuration may include a data processing apparatus 410, a data storage apparatus 420, a wireless interface 430, a controller interface 440, and an interconnect 450 through which the data processing apparatus 410 may access the other components. The data processing apparatus 410 is operable to execute instructions that have been stored in a data storage apparatus 420. In some implementations, the data processing apparatus 410 is a processor with random access memory for temporarily storing instructions read from the data storage apparatus 420 while the instructions are being executed. For example, the data storage apparatus 420 may be a non-volatile information storage device such as a hard drive or a solid-state drive. The wireless interface 430 facilitates communication with other devices, for example, a personal device of a user. For example, wireless interface 430 may facilitate communication via a vehicle Wi-Fi network with a tablet device held by a passenger in the vehicle. For example, wireless interface 430 may facilitate communication via a vehicle WiMAX network with a smartphone device held by a user at a remote location. The controller interface 440 allows input and output of information to other systems within a vehicle to facilitate automated control of the vehicle. For example, the controller interface 440 may include serial ports (e.g., RS-232 or USB) used to issue control signals to actuators in the vehicle and to receive sensor data from a sensor module. For example, the interconnect 450 may be a system bus, or a wired or wireless network.

It may be desirable to share vehicle video between vehicles in order to, for example, learn about road conditions further ahead on a planned path for a vehicle. In some implementations, vehicle video and associated data is collected from vehicles on an opt-in basis. In some implementations, information identifying a user or vehicle the video originated from is removed from the video and is not associated with it.

Figure 5:
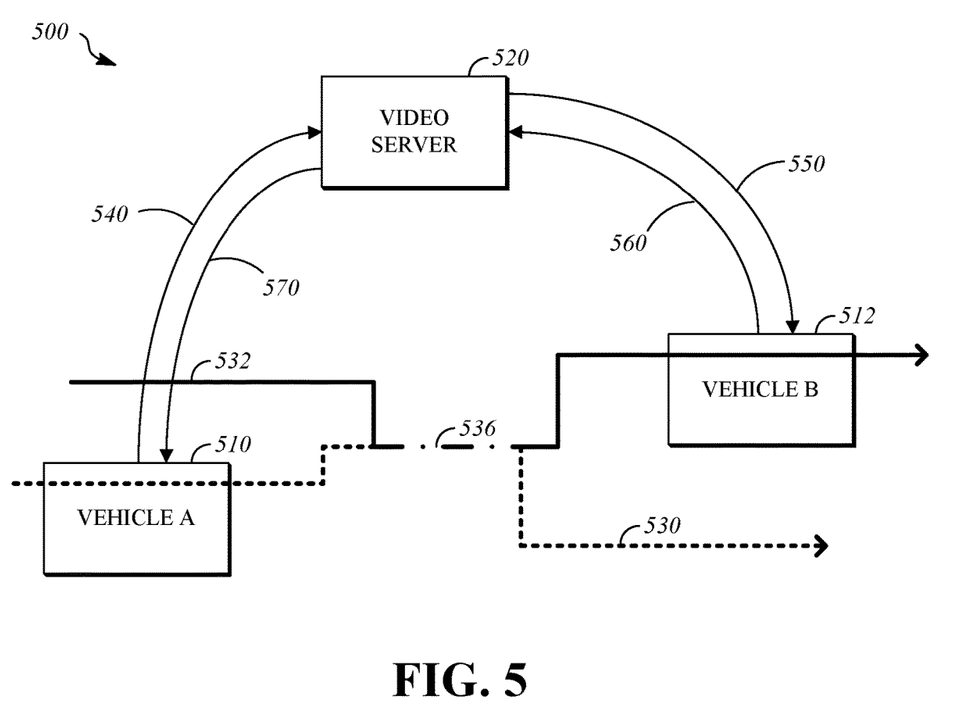
FIG. 5 is an illustration of an exemplary system for sharing video of a path traversed by a vehicle.

FIG. 5 shows an example of a system 500 for sharing video of a path traversed by a vehicle. In this example scenario, a passenger in vehicle A 510 wishes to preview a planned path 530 for vehicle A 510. Vehicle A 510 transmits a request 540 to video server 520 for vehicle video obtained along path 530. For example, the request 540 may ask for the most recent available vehicle video from along path 530. In some implementations, the request may specify a time window of interest (e.g., within an hour of the same time yesterday or last week). For example, Vehicle A 510 may be similar to vehicle 300 of FIG. 3.

The video server 520, in response to the request 540, searches for vehicle video from along path 530 in a database storing or referencing vehicle video from vehicles that have registered to share vehicle video. In some implementations, vehicles that have registered to share vehicle video (e.g., vehicle A 510 and vehicle B 512) continuously, periodically, and/or selectively upload vehicle video to video server 520 as they obtain the vehicle video. In some implementations, vehicles that have registered to share vehicle video (e.g., vehicle A 510 and vehicle B 512) continuously, periodically, and/or selectively upload location information for the respective vehicle to facilitate the video server 520 searching for vehicle video by location and/or time and make vehicle video available for upload upon request.

In this example scenario, the video server 520 identifies, based on information in a vehicle location database, vehicle B 512 as having previously traveled, within a time window of interest, on path 532, which intersects with path 530 at or along intersection 536. Video server 520 transmits a request 550 to vehicle B 512 for vehicle video associated with its time traveling along the intersection 536 of path 530 and path 532. The video server 520 then receives the vehicle video 560 corresponding to the intersection 536 of paths. The video server 520 transmits vehicle video 570 to vehicle A 510. Vehicle video 570 may include vehicle video 560 and may also include vehicle video from other vehicles in order to cover the planned path 530.

Vehicle A 510 may begin presenting a portion of the vehicle video 570 to the passenger in vehicle A 510. For example, Vehicle A 510 may implement a process similar to process 100 described in relation to FIG. 1, where the vehicle video is obtained from the video server 520 instead of being obtained using one or more cameras mounted on Vehicle A 510, to present a portion of vehicle video 570 to the passenger. In some implementations, an interface in which the passenger views a portion of the vehicle video 570 may include a user interface element such as a scrub bar that allows the user to select portions of the vehicle video associated with different locations along path 530.

Video server 520 may include a data processing apparatus, a data storage apparatus, a wireless interface, and an interconnect through which the data processing apparatus may access the other components. The data processing apparatus is operable to execute instructions that have been stored in a data storage apparatus. In some implementations, the data processing apparatus may be a processor with random access memory for temporarily storing instructions read from the data storage apparatus while the instructions are being executed. For example, the data storage apparatus may be a non-volatile information storage device such as a hard drive or a solid-state drive. The wireless interface facilitates communication with other devices, for example, a personal device of a user.

In some implementations (not shown), a video server (e.g., video server 520) may, rather than forwarding vehicle video between vehicles, refer a vehicle requesting vehicle video from a path to one or more other vehicles possessing vehicle video of interest. The requesting vehicle may then request the relevant vehicle video from another vehicle directly. In some implementations, the vehicle possessing the relevant vehicle video for the planned path may directly present portions of that vehicle video to a personal device of a user situated in the requesting vehicle (e.g., a passenger).

Figure 6:
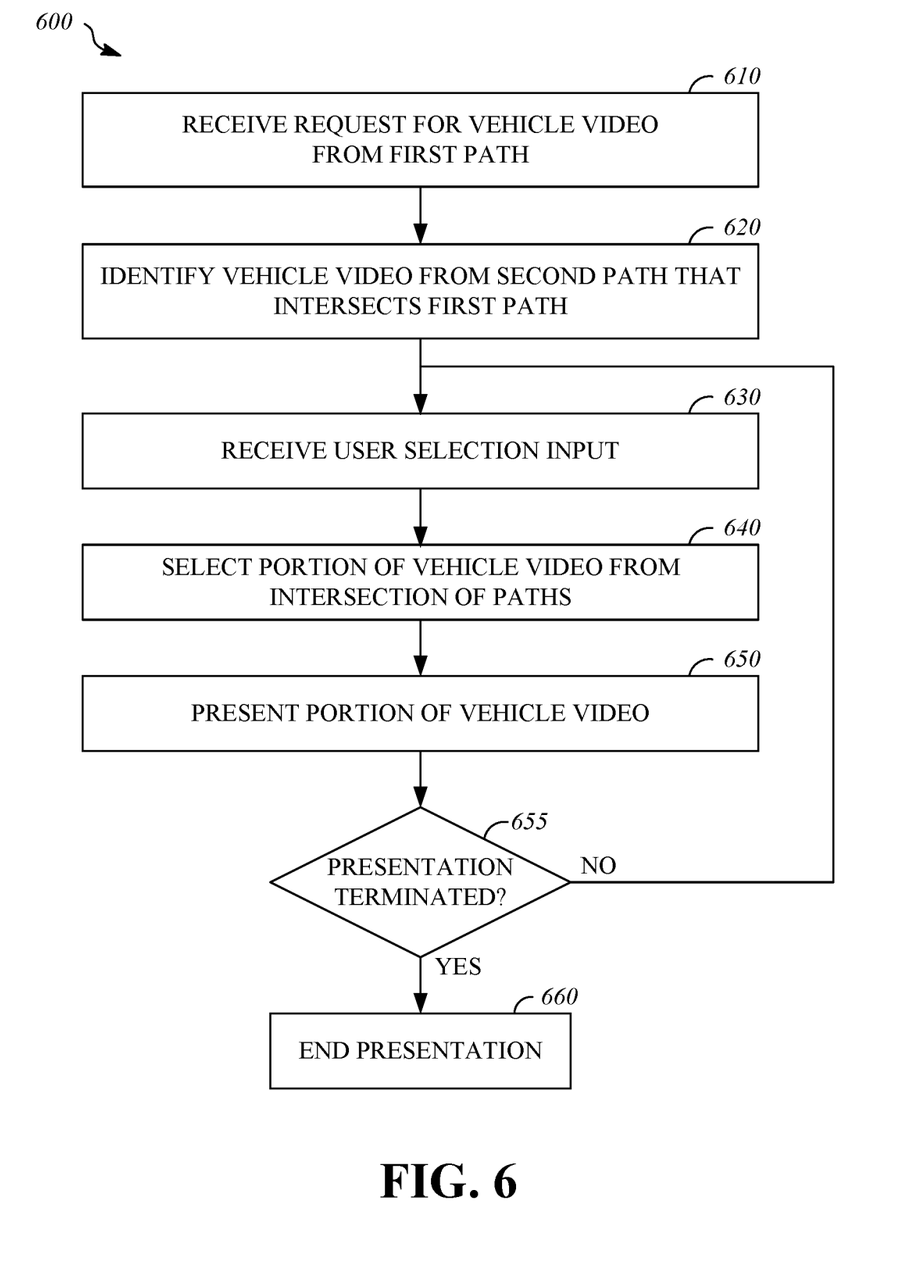
FIG. 6 is a flowchart of an exemplary process for sharing video of a path traversed by a vehicle.

FIG. 6 shows an example of a process 600 for sharing video of a path traversed by a vehicle. A request for vehicle video along a first path is received in operation 610. For example, the request may be received from a vehicle or a personal device of a user. The request may specify the path and time of interest. For example, the time of interest may be implied as the most recent available time. In some implementations, the time of interest is specified as a time window of interest (e.g., within an hour of the current time yesterday or last week). For example, the path may be a planned path to be traveled in a vehicle.

Vehicle video from a second path that intersects with the first path is identified in operation 620, where the second path was previously traveled by a vehicle that obtained the vehicle video. Identifying the vehicle video for this intersection of the paths in operation 620 may include searching a database of location information for registered vehicles that have traveled on paths intersecting with the first path. In some implementations, the location information is stored along with vehicle video previously uploaded by the registered vehicles.

Selection input from a user may be received in operation 630. Selection input may specify a portion of vehicle video from the intersection of paths that is of interest to a user. In some implementations, selection input may specify a location along the first path. For example, an interface in which the user views a portion of the vehicle video may include a user interface element such as a scrub bar that allows the user to select portions of the vehicle video associated with different locations along the first path. For example, the scrub bar may be superimposed over the first path in a map depicting the first path. In some implementations, may be just a straight line, but it may include markers corresponding to objects represented in map data (e.g., landmarks or select street addresses). In some implementations, selection input includes one or more parameters that specify a viewing angle within an available vehicle video. In some implementations, selection input may specify a time offset, for example, an estimated time offset from the start of a planned trip along the first path. For example, a user may view a portion of the vehicle video on a personal device and the display of the personal device may overlay a user interface element such as a scrub bar. The user may slide an icon along the scrub bar on their display to specify a time offset at which they wish to view portions of the vehicle video from the intersecting path(s). Data specifying this time offset may be forwarded to an image processing module (e.g., an image processing module running on video server 520 of FIG. 5). In some implementations, selection input may be received in operation 130, in wireless communications signals from a device operated by a user.

A portion of the vehicle video from the intersection of paths may be selected in operation 640. In some implementations, portion of the vehicle video is selected in operation 640 based in part on a location along the first path, where the location is specified by the user. In some implementations, a portion of the vehicle video is selected in operation 640 based in part on a viewing angle specified by a user. In some implementations, portion of the vehicle video is selected in operation 640 based in part on a time offset specified by a user. For example, a portion of the vehicle video may be selected in operation 640 by an image processing module (e.g., an image processing module running on video server 520 of FIG. 5).

A selected portion of the vehicle video of the intersection of paths may be presented to a user in operation 650. In some implementations, the portion of the vehicle video is presented in operation 650 by transmitting communications signals encoding the portion of the vehicle video to a personal device (e.g., a tablet, a smartphone, a head-mounted display) of a user that is configured to display the portion. For example, a selected portion of the vehicle video may include one or more images depicting a view from a vehicle at a point along the second path that is within the intersection of the first path and the second path.

A vehicle video presentation session may be terminated 660 by the user or another event or command (e.g., a command from another user who controls access to the vehicle video) processed by an image processing module of the vehicle. If, at operation 655, the vehicle video presentation session is not terminated, an image processing module may continue receiving additional selection input from the user in operation 630 and/or presenting additional portions of the vehicle video to the user in operation 650. For example, the user may be situated in a vehicle that is configured to travel on the first path.

For example, process 600 may be implemented by video server 520 described in relation to FIG. 6.

Another aspect of the disclosure is a system that includes a data processing apparatus and a data storage apparatus. The data storage apparatus stores instructions that are executable by the data processing apparatus that upon execution by the data processing apparatus cause the data processing apparatus to perform operations. The operations include obtaining a video based on images detected with cameras mounted on a vehicle, associating frames of the video with locations of the vehicle, storing the video in a memory, determining a first location of the vehicle, determining a match between the first location and a second location of the vehicle, where the second location is associated with one or more frames of the video stored in the memory, selecting a portion of the video, where the portion of the video is based on the one or more frames of the video that are associated with the second location of the vehicle, and displaying the portion of the video.

In some implementations, determining the match between the first location and the second location comprises searching the memory for frames of the video based on proximity to the first location. In some implementations, determining the match between the first location and the second location comprises projecting the first location onto a path specified by locations associated with frames of the video stored in the memory. In some implementations, determining the match between the first location and the second location comprises identifying an object represented in map data corresponding to a range of coordinates that includes the first location, and determining that the second location is within the range of coordinates corresponding to the object.

In some implementations, the portion of the video is selected based in part on a user selection of a viewing angle. In some implementations, the user selection of the viewing angle includes rotation of a hand-held display device. In some implementations, the user selection of the viewing angle includes tilting or turning a head-mounted display device.

In some implementations, displaying the portion of the video comprises wirelessly transmitting the portion of the video to an electronic device. In some implementations, the operations performed by the data processing apparatus further include presenting a list of historical views of the first location that are available in the memory, where the historical views are listed with associated times, and receiving selection input specifying a time associated with a frame of the video that is associated with the second location. In some implementations, the video is a composite video. In some implementations, the video is a panoramic video.

What is claimed is:

1. A method comprising:
   obtaining a video based on images detected with cameras mounted on a vehicle;
   storing the video in a memory;
   selecting a portion of the video based on:
      input representing selection of a viewing angle, wherein the viewing angle has been determined based on a relative orientation of a personal electronic device of a user to a body of the vehicle; and
      input specifying a time offset, wherein the time offset is specified by user interaction with a scrub bar of a user interface displayed on the personal electronic device, and wherein the scrub bar is configured for selection of different locations along a path that the vehicle previously traveled; and
   displaying the selected portion of the video corresponding to the viewing angle and the time offset.

2. The method of claim 1, wherein the video comprises frames produced from at least portions of images detected with at least two cameras mounted on the vehicle.

3. The method of claim 1, wherein displaying the selected portion of the video comprises sending the selected portion of the video to another electronic device in wireless communication with the personal electronic device or the vehicle, the other electronic device being remote from the vehicle.

4. The method of claim 1, further comprising:
   selecting a second portion of the video based on a second user selection of a second time offset; and
   causing a second electronic device in communication with the vehicle to display the second portion of the video corresponding to the second time offset.

5. The method of claim 4,
wherein selecting the second portion of the video further comprises selecting the second portion of the video based on a second viewing angle different from the viewing angle, and
wherein causing the second electronic device to display the second portion of the video further comprises causing the second electronic device to display the second portion of the video corresponding to the second time offset and the second viewing angle.

6. The method of claim 1, wherein the input representing the viewing angle comprises data corresponding to a gyroscope measurement.

7. The method of claim 1, wherein the video comprises frames produced from images detected with the cameras at the same location at different times.

8. A non-transitory computer readable storage device having computer executable program instructions that are executable by one or more processors of a vehicle, wherein the computer executable program instructions, when executed, cause the one or more processors to:
obtain a video based on images detected with cameras mounted on a vehicle;
store the video in a memory;
select a portion of the video based on:
a user selection of a viewing angle, wherein the viewing angle has been determined based on a relative orientation of a personal electronic device of a user to a body of the vehicle; and
a selection input specifying a time offset, wherein the time offset is specified by user interaction with a scrub bar of a user interface displayed on the personal electronic device, and wherein the scrub bar is configured for selection of different locations along a path that the vehicle previously traveled; and
send, to the personal electronic device using a network interface, the selected portion of the video corresponding to the viewing angle and the time offset.

9. The non-transitory computer readable storage device of claim 8, wherein the video comprises frames produced from at least portions of images detected with at least two cameras mounted on the vehicle.

10. The non-transitory computer readable storage device of claim 8, wherein the network interface is a wireless network interface and the personal electronic device is in wireless communication with the vehicle.

11. The non-transitory computer readable storage device of claim 10, wherein the instructions further cause the one or more processors to:
select a second portion of the video based on a second user selection of a second time offset; and
cause a second electronic device in communication with the vehicle to display the second portion of the video corresponding to the second time offset.

12. The non-transitory computer readable storage device of claim 11,
wherein the instructions that cause the one or more processors to select the second portion of the video further cause the one or more processors to select the second portion of the video based on a second viewing angle different from the viewing angle, and
wherein the instructions that cause the one or more processors to cause the second electronic device to display the second portion of the video further cause the one or more processors to cause the second electronic device to display the second portion of the video corresponding to the second time offset and the second viewing angle.

13. The non-transitory computer readable storage device of claim 10, wherein the viewing angle is determined based on data corresponding to a gyroscope measurement.

14. The non-transitory computer readable storage device of claim 8, wherein the video comprises frames produced from images detected with the cameras at the same location at different times.

15. A vehicle comprising:
a plurality of cameras;
a network interface;
a memory; and
one or more computer processors configured to:
obtain a video based on images detected with the plurality of cameras;
store the video in the memory;
process a portion of the video based on:
input representing selection of a viewing angle, wherein the viewing angle has been determined based on a relative orientation of a personal electronic device of a user to a body of the vehicle; and
a selection input specifying a time offset, wherein the time offset is specified by user interaction with a scrub bar of a user interface displayed on the personal electronic device, and wherein the scrub bar is configured for selection of different locations along a path that the vehicle previously traversed; and
send, to the personal electronic device using the network interface, the processed portion of the video corresponding to the viewing angle and the time offset.

16. The vehicle of claim 15, wherein the video comprises frames produced from at least portions of images detected with at least two cameras from the plurality of cameras.

17. The vehicle of claim 15, wherein the personal electronic device is a first electronic device, and wherein the one or more computer processors are further configured to:
select a second portion of the video based on a second user selection of a second time offset; and
cause a second electronic device in communication with the first electronic device or the vehicle to display the second portion of the video corresponding to the second time offset.

18. The vehicle of claim 17,
wherein the one or more computer processors are further configured to select the second portion of the video further based on a second viewing angle different from the viewing angle, and
wherein causing the second electronic device to display the second portion of the video further comprises causing the second electronic device to display the second portion of the video corresponding to the second time offset and the second viewing angle.

19. The vehicle of claim 15, wherein the input representing the viewing angle comprises data corresponding to a gyroscope measurement.

20. The vehicle of claim 15, wherein the video comprises frames produced from images detected with the cameras at the same location at different times.

* * * * *